United States Patent [19]

Gibson et al.

[11] Patent Number: 4,617,451

[45] Date of Patent: Oct. 14, 1986

[54] INDUCTANCE SENSOR

[75] Inventors: Stanley Gibson, Bangor; Colin Tindall, Ballynahinch; John Graham, Ballyclare, all of Northern Ireland

[73] Assignee: Davidson & Company Limited, Belfast, Northern Ireland

[21] Appl. No.: 636,573

[22] Filed: Aug. 1, 1984

[30] Foreign Application Priority Data

Aug. 3, 1983 [GB] United Kingdom ............... 8320962

[51] Int. Cl.⁴ ............................................. H05B 1/02
[52] U.S. Cl. .................................... 219/490; 219/389; 219/373; 324/207
[58] Field of Search ............... 219/342, 363, 490, 491, 219/366, 359, 389, 373, 481, 482; 324/207, 208, 228, 234

[56] References Cited

U.S. PATENT DOCUMENTS

| 1,366,979 | 2/1921 | Ullrich | 324/234 |
| 3,010,063 | 11/1961 | Rhoades | 324/207 |
| 3,555,416 | 1/1971 | Lucka | 324/207 |
| 4,000,448 | 12/1976 | Shum et al. | 324/207 |
| 4,387,339 | 6/1983 | Akerblom | 324/207 |

FOREIGN PATENT DOCUMENTS 2091003 7/1982 United Kingdom .

Primary Examiner—M. H. Paschall
Attorney, Agent, or Firm—Merchant, Gould, Smith, Edell, Welter & Schmidt

[57] ABSTRACT

An inductance sensor is intended for determining or controlling the gap between a sealing strip and sector plate in a rotary regenerative air preheater of the rotating-matrix type, the strip being on the matrix and being swept past the non-rotating plate. The sensor has a U-shaped core the legs of which lie in a plane generally corresponding to that containing the sealing strip when nearest to the sensor. The legs have unequal coils on them. Energization of the coils allows information to be derived concerning the gap between the strip and plate which may be recorded, displayed, or directly used to adjust that gap to a desired value by movement of the sector plate.

11 Claims, 3 Drawing Figures

INDUCTANCE SENSOR

FIELD OF THE INVENTION

This invention relates to an inductance sensor particularly intended for use in proximity measurements in adjusting or determining a seal gap in a rotary regenerative air pre-heater.

BACKGROUND OF THE INVENTION

We have disclosed in UK patent application No. 2091003 how magnetically driven sealing systems of a rotary genenerative air pre-heater may be controlled by response to proximity sensors, and a particular type of sensor is disclosed in that application.

That type is very suitable when the pre-heater is of the stationary matrix type, over end faces of which rotating hoods pass to guide heat exchange media through the heat exchange mass contained in the matrix. The seal on that type of regenerator is a frame borne on the hood which has a comparatively wide and massive strip, known as the shoe, which moves over the face of the matrix.

However, in the type where the hoods are stationary and the matrix is rotating the seals which are borne on the rotating matrix are comparatively narrow strips mounted "edge on" on the matrix and offering therefore a narrow target to sensors which are based on the stationary sector plates which cover the ends of the matrix, which sensors are to control a drive which adjusts the sector plates so that they are in a predetermined spatial relationship with the sealing strips.

SUMMARY OF THE INVENTION

To meet this need we have evolved the sensor which is the object of the present invention.

The sensor has a U-shaped core on the parallel legs of which are mounted coils of unequal number of turns. The core is mounted behind a cover plate through which the ends of its legs are exposed and the cover plate is discontinuous between the ends of the legs—most suitably there will be a comparatively narrow parallel sided slit in the cover plate.

The difference in the number of turns in the two coils is found to effectively increase the sensor sensitivity and the difference may be such that there is a ratio of at least 2:1 preferably 3:1 in the number of turns in the two coils.

The sensor is best mounted so that the line joining the two parallel legs of the core is in a plane also containing the line of the edge of the seal strip as the latter rotates past the sensor. In practice most of the seal strips are double having two edges spaced apart by some 20 to 40 mm. Exact parallelism is not required but it is found that the most definite and sharpest signals are given when parallelism is as nearly as possible achieved.

The impedence signals derived from the sensors through an appropriate sensing circuit are a wave formation the frequency of which is a measure of the proximity of the sealing strip and which can be recorded for display or converted as a DC signal to be taken off to control appropriately the drive for the sealing means.

The spatial relationship to be achieved (most desirably a gap of 1 or 2 mm between the edge of the strip and the sensor face) can be compared with a pre-set gap set in front of a comparison sensor mounted in the same environment or with a pre-set signal from the control circuit, whereby to eliminate any possibility of error due to the hostile temperature or other environmental conditions which are experienced by the sensors in the pre-heater.

DESCRIPTION OF THE DRAWINGS AND OF THE PREFERRED EMBODIMENT

A particular embodiment of the sensor will be described with reference to the accompanying drawings wherein.

Figure 1:
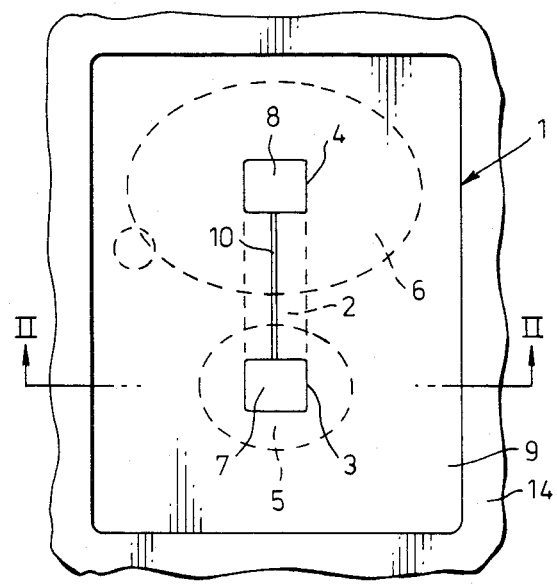
FIG. 1 is a plan view of a sensor.

In FIG. 1 a casing of a sensor 1 has mounted within it a U-shaped laminated magnetically susceptible core 2 on the parallel legs 3,4 of which are formed coils 5, 6, the coils being of unequal number of turns.

The ends 7,8 of the legs 3,4 of the core project through a cover plate 9 of the casing, and there is a gap 10 in that cover plate suitably in the form of a comparatively narrow parallel sided slit. The coils are arranged in an oscillator circuit energised by low voltage DC supply.

Figure 2:
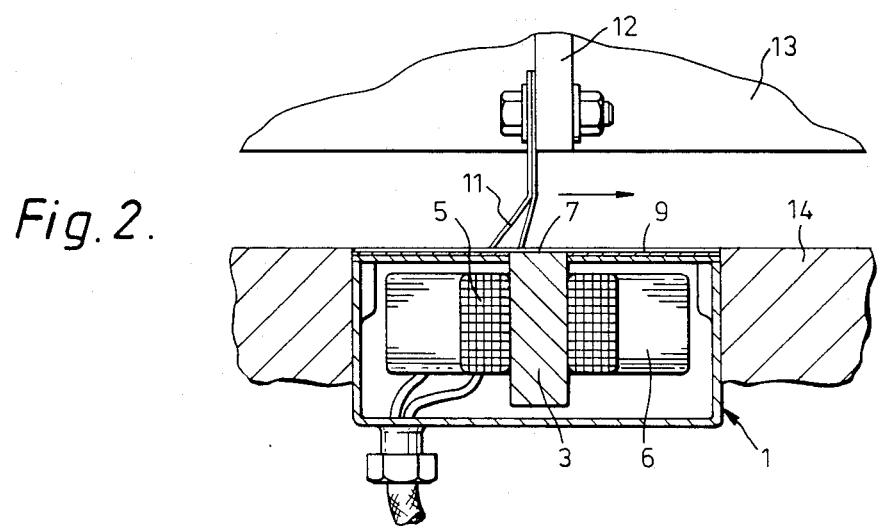
FIG. 2 is a sectional elevation on the line II—II of FIG. 1 and showing the sensor mounted on a pre-heater and FIG. 3 is a sectional view of a rotating-matrix rotary regenerative air preheater.
Figure 3:
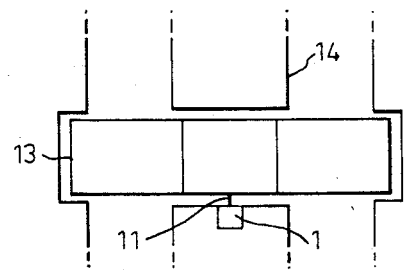

As shown best in FIG. 2, the sensors 1 are mounted adjacent to the end face, preferably being on the non-rotatable but axially adjustable sector plates 14 of a rotary regenerative air pre-heater 15 of the rotating matrix type; the sensors 1 are positioned so as to detect the proximity of elongated blade-like sealing strips 11 mounted on the dividing and peripheral walls such as radial wall 12 of the rotating matrix 13. They are so mounted with the line extending between the parallel legs 3,4 of the core arranged parallel to the line of the strips 11, that is to say so that the line coincides closely with the line of projection of the sealing strips as they sweep past the sensor. In this arrangement, the dimension between the legs 3, 4 is generally parallel to the direction of elongation of the strips 11 as the strips pass the sensor 1 opposing the legs. The sensors may be mounted near the hub, at the extreme radial edge and also in the middle of the radial thickness of the sector of the pre-heater or indeed on an axial plate (if present) and may respectively drive through control circuitry drive mechanism which lift or lower the sealing surface of the non-rotating part (in this case the sector plates 14) so as to maintain them in a previously determined relationship with the edges of the sealing strips.

The impedance signals derived from the sensors as the sealing strips sweep past them are a wave, the frequency of which corresponds to the proximity of the strip. This signal is converted by conventional control circuitry to a drive signal for the drive means which in this embodiment are magnetic drive means. Alternatively or additionally it may be recorded or displayed in any conventional manner. The direction and amount of response of the drive means to any particular signal may be predetermined as against a reference signal which is taken to represent a desired gap or preferably given the hostile environment of the pre-heater by comparison with a comparison sensor which is mounted on the pre-heater at a pre-set physical gap from a portion of sealing strip whether a signal is derived from a strip at that position in the actual operating conditions obtained at that particular time. Examples of circuitry which receive a signal to effect a drive signal for a drive means in a rotary generative air pre-heater are shown in U.K. patent application No. 2 091 003.

A preferred minimum ratio between the number of turns in the two coils is 2:1 and 3:1 is a more preferred ratio.

We claim:

1. A regenerative air pre-heater comprising:
a rotary matrix (13);
a non-rotary axially adjustable member (14) with said rotary matrix (13) and axially adjustable member (14) presenting opposing spaced apart faces with a plurality of elongate sealing strips (11) carried on said rotary matrix (13) and arranged to sweep past a sealing surface of said axially adjustable member (14) as said matrix (13) rotates;
an inductive sensor (1) for sensing axial spacing of said matrix (13) and axially adjustable member (14) having a U-shaped core with parallel legs including a first leg (3) and a second leg (4), a first coil (5) on said first leg (3) and a second coil (6) on said second leg (4), each of said coils having a plurality of turns with a number of turns in one of said coils being different from a number of turns in the other of said coils;
means for mounting said sensor (1) on said axially adjustable member (14) with said first and second legs aligned with a dimension extending between said legs being generally parallel to the direction of elongation of said strips (11) as said strips pass said sensor (1) opposing said legs;
whereby said strips sweeping past said sensor have an inductive effect indicative of spacing between said strips and said sensor which effect may be measured and used to control axial spacing of said matrix and axially adjustable member.

2. A rotating-matrix rotary regenerative air preheater according to claim 1 wherein the sealing surface is provided by sector plates which are adjustable as to their axial relationship with the matrix, there being drive means for adjusting that relationship and wherein the data are applied to actuate the drive means to adjust the relationship to a desired value.

3. A rotating-matrix rotary regenerative air preheater according to claim 2 wherein the desired value is obtained by comparison with data derived from a comparison sensor also mounted on the non-rotating part of the preheater to undergo conditions similar to the said at least one inductance sensor, the comparison sensor being a said inductance sensor but being permanently in a desired relationship with a dummy inductive load.

4. A rotating-matrix rotary regenerative air preheater according to claim 2 wherein an inductance sensor is mounted on each of a plurality of the sector plates.

5. A rotating-matrix rotary regenerative air preheater according to claim 1 wherein the U-shaped core of the inductance sensor is mounted behind a cover plate having apertures exposing the free ends of the legs, and there is a continuous gap in the cover plate extending from one aperture to the other.

6. A rotating-matrix rotary regenerative air preheater according to claim 5 wherein the ratio of the number of turns in one of the coils to the number of turns in the other is at least 2:1.

7. An inductance sensor for a rotating-matrix rotary regenerative preheater wherein sealing strips are borne on end faces of the matrix, the sensor being for determining the spacing of the sealing strips from a non-rotating sealing surface and comprising a U-shaped core around the parallel legs of which are mounted unequal coils each of said coils having turns with the number of turns in one of the coils being different from the number of turns in the other of the coils.

8. An inductance sensor according to claim 7 wherein the U-shaped core is mounted behind a cover plate having apertures exposing the free ends of the legs, and there is a continuous gap in the cover plate extending from one aperture to the other.

9. An inductance sensor according to claim 8 wherein the gap is a straight slit.

10. An inductance sensor according to claim 9 wherein the ratio of the number of turns in one of the coils to the number of turns in the other is at least 2:1.

11. An inductance sensor according to claim 10 wherein the said ratio is at least 3:1.

* * * * *